United States Patent [19]
Ai et al.

[11] Patent Number: 5,398,112
[45] Date of Patent: Mar. 14, 1995

[54] METHOD FOR TESTING AN OPTICAL WINDOW WITH A SMALL WEDGE ANGLE

[75] Inventors: Chiayu Ai; James C. Wyant, both of Tucson, Ariz.

[73] Assignee: Wyko Corporation, Tucson, Ariz.

[21] Appl. No.: 131,486

[22] Filed: Oct. 4, 1993

[51] Int. Cl.⁶ ............................................... G01B 9/02
[52] U.S. Cl. .................... 356/359; 356/345; 356/353
[58] Field of Search ............... 356/345, 352, 353, 359, 356/360

[56] References Cited

U.S. PATENT DOCUMENTS

| | | | |
|---|---|---|---|
| 4,818,108 | 4/1989 | Eppinger | 356/360 |
| 5,335,059 | 8/1994 | Maruyana et al. | 356/359 |

OTHER PUBLICATIONS

"Digital wave front measuring interferometer for testing optical surfaces and lenses" by J. H. Bruning, D. E. Gallagher, D. P. Rosenfeld, A. D. White, D. J. Brangaccio, and D. R. Herriott, Appl. Opt. 13, pp. 2693-2703 (1974).

"Digital wave-front measuring interferometry: some systematic error sources" by J. Schwider, R. Burrow, K.-E. Elssner, J. Grzanna, R. Spolaczyk, and K. Merkel, Appl. Opt. 22, pp. 3421-3432 (1983).

"Digital phase-stepping interferometry: effects of multiply reflected beams" by P. Hariharan, Appl. Opt. 26, pp. 2506-2507 (1987).

"Effect of spurious reflection on phase shift interferometry" by C. Ai and J. C. Wyant, Appl. Opt. 27, pp. 3039-3045 (1988).

"Phase-determination of Fizeau interferences by phase-shifting interferometry" by G. Bonsch and H. Bohme, Optik 82, pp. 161-164 (1989).

"Evaluation of Fizeau interferences by phase-shifting interferometry" by R. A. Nicolaus, Optik 87, pp. 23-26 (1991).

"Effect of retroreflection of a Fizeau Phase-shifting interferometer" by C. Ai and J. C. Wyant, Appl. Opt., in press.

*Primary Examiner*—Samuel A. Turner
*Assistant Examiner*—Robert Kim
*Attorney, Agent, or Firm*—Charles R. Hoffman

[57] ABSTRACT

The invention provides a technique for eliminating "ripple" or ghost fringes from a wavefront transmitted by an optical window with a very small wedge angle, distortions in the wavefront being measured by an interferometer. A collimated beam produced by the interferometer is transmitted through the optical window, which is tilted so as to prevent direct reflections from entering a detector of the interferometer. The beam transmitted through the window is reflected by a return flat back through the window and transmitted to the detector. The return flat is tilted slightly in the direction of or opposite to the direction of tilt of the window, causing the re-incident angle of the returned ray to be different from the original incident angle of the collimated beam. This causes the multiple reflections within the window to be different and to be out of phase. The ghost fringes are cancelled by appropriately tilting the return flat.

10 Claims, 4 Drawing Sheets

METHOD FOR TESTING AN OPTICAL WINDOW WITH A SMALL WEDGE ANGLE

BACKGROUND OF THE INVENTION

The invention relates to a method for tilting both an optical window having a small wedge angle and a planar return flat so as to cancel "ripple" or "ghost fringes" in the intensity pattern of the wavefront which is transmitted by the window and then returned by the planar return flat. The ghost fringes occur as a result of both multiple internal reflections within the window and the small wedge angle. The optical window can be a plane parallel plate or a dome-shaped window with opposed surfaces having the same center of curvature.

Spurious reflections usually introduce errors into measurement results obtained with laser phase-shifting interferometry. Work has been done for a Fizeau interferometer to reduce or eliminate the effect of the multiple reflections between a test surface and a reference surface. It is known that if a four-frame phase calculation algorithm is used, the phase error caused by multiple reflections is eliminated to a first order approximation. A new algorithm is known which can completely eliminate the phase error due to multiple reflections of a test mirror. However, no one has been able to eliminate "ripple" errors due to very small wedge angles of an optical window, i.e., of a plane parallel plate.

Multiple reflections between two surfaces of a window introduce a fixed pattern error in the transmitted wavefront. In a Fizeau or Twyman-Green interferometer this wavefront is reflected by a return flat and transmitted back through the window. The fixed pattern error or ghost fringe pattern is carried in the measurement result. The ghost fringe pattern error is negligible only if the wedge angle is so large that the interference fringes in the interference pattern representing the transmission characteristics of the window are too dense for the detector to resolve. However, if the wedge angle is small (e.g. several arc-seconds), the phase error could be up to 0.025 fringes for most glass. The measurement of a precision optical window requires an accuracy of the transmitted wavefront within 0.1 fringe or smaller. Therefore, the 0.025 fringe error caused by the multiple reflections significantly effects the accuracy of the measurement. The size of wedge angle that causes appreciable ripple depends on the diameter of the window. For example, for a 1 inch window a wedge angle of 2 arc-seconds will produce one ghost fringe, but for a 10 inch window a wedge angle of only 0.2 arc-seconds will produce one ghost fringe.

Figure 1:
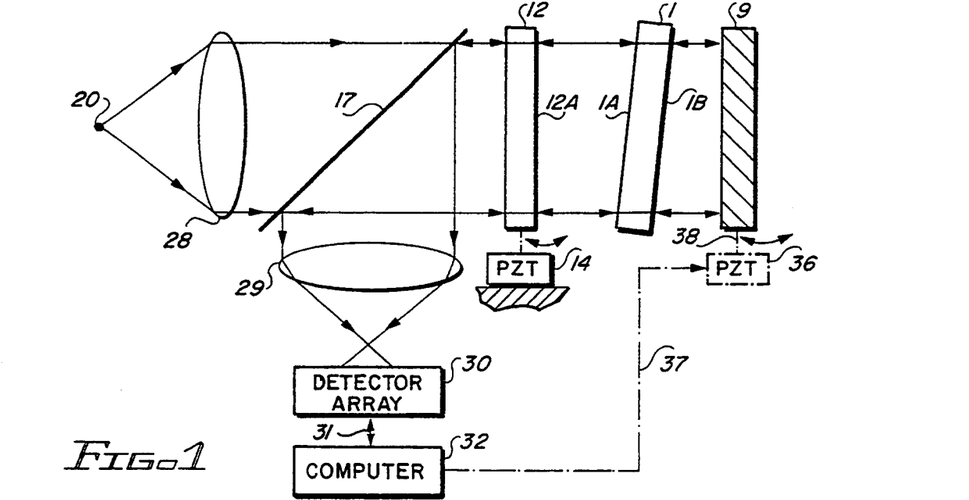
FIG. 1 is a diagram illustrating a phase shifting interferometer used in practicing the present invention.

FIG. 1 shows a planar parallel plate or optical window 1 being testing in a conventional interferometer 33, such as a WYKO 6000. The relative amplitudes of the successive internally reflected rays such as 2C and 2F are 1, $r^2$, $r^4$, . . . , where r is the coefficient of reflection of window 1. If the incident angle (i.e., the angle between line 3, which is perpendicular to window surface 1A, and incident beam 2A) is $\theta$, it can be shown that the optical path difference (OPD) of two successive rays is equal to $2dn\cos(\theta)$, where d and n are the thickness and the refractive index of window 1, respectively, and $\theta$ is the refractive angle between the perpendicular line 3 and refracted ray 2B in FIG. 1A. It should be appreciated that window 1 must be tilted at an incident angle of $\theta$ to prevent a portion of rays multiply reflected by surfaces 1A and 1B and spuriously transmitted rays from returning into the detector 30 of interferometer 33 of FIG. 1. The coefficient of reflection (r) of most optical glass is about 20%. Therefore the multiple reflections of a window can be approximated by the first two rays, i.e., 2C and 2F, with reflective amplitudes of 1 and $r^2$, respectively.

Figure 1A:
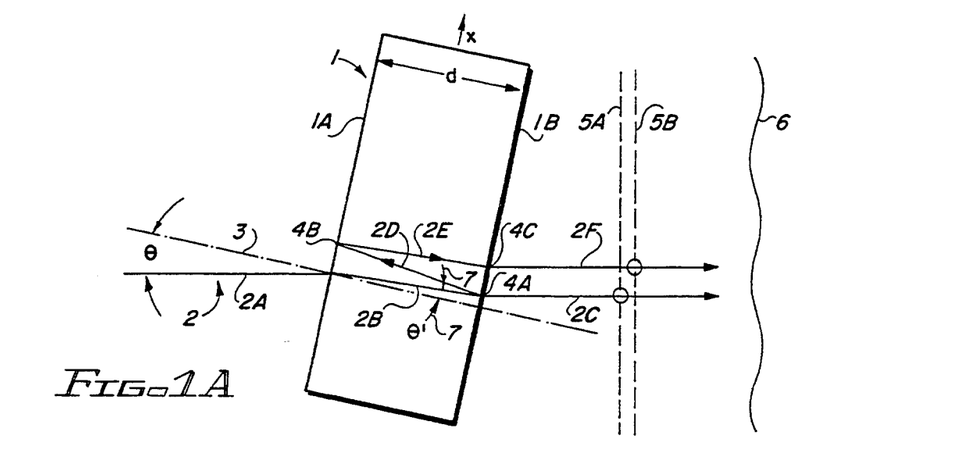
FIG. 1A is a diagram useful in explaining the background problem which the invention solves.

"Composite" wavefront 5A,B and the measurement results have "ripples" in intensity 6 of the interferogram perpendicular to the wedge direction x. The transmitted wavefront 5A has intensity levels much greater than wavefront 5B. Nevertheless, the composite wavefront 5A,B has an appreciable ripple or ghost fringe pattern caused by interference of wavefront 5B with wavefront 5A. If the primary incident beam 2A and the secondary beam 2F are not parallel due to a minute wedge angle between window surfaces 1A and 1B, then the transmitted composite wavefront 5A,B will have a ripple or ghost fringe pattern in its interferogram. The density of ghost fringes is proportional to the wedge angle of the window. For large wedge angles, the density of fringes is so great that it is undetectable and does not cause appreciable error in measurements.

Figure 2:
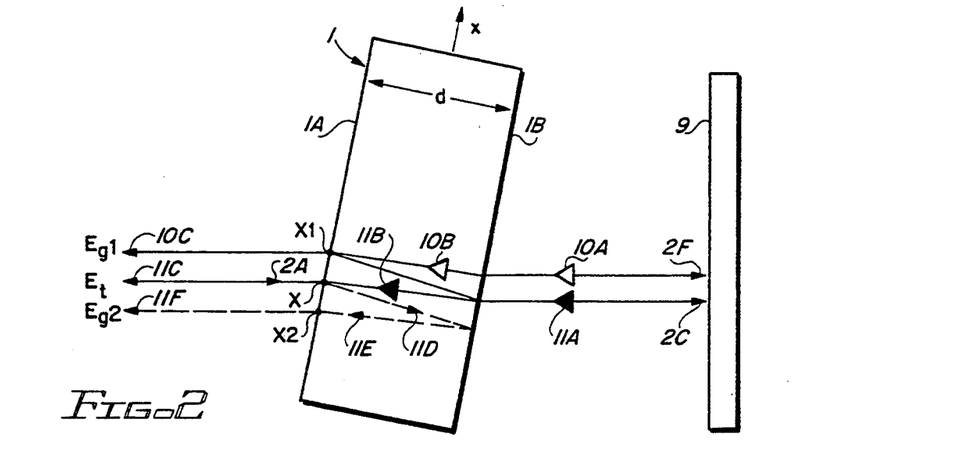
FIG. 2 is a diagram useful in explaining ghost fringes in the interferogram of a wavefront transmitted through an optical window having a small wedge angle, while the return flat is not tilted.

As shown in FIG. 2, the two rays 2C and 2F are reflected back by a return flat 9 as rays 11A and 10A, respectively, to window 1. The coefficient of reflection of return flat 9 is s, as shown in FIG. 1. Between window 1 and return flat 9 the filled-arrow ray 11A has a relative amplitude of s, and the open-arrow ray 10A has a relative amplitude of $r^2s$. Each of the two rays 11A and 10A reflected by return flat 9 undergoes multiple reflections within window 1. Due to the multiple reflections 11D and 11E of the primary "filled-arrow" ray 11B in window 1, the transmitted ray can be approximated by the first two rays 11C and 11F, $E_t$ and $E_{g2}$. Because of the low reflectivity of window 1, the multiple reflections of the "open-arrow" ray 10B inside window 1 are negligible, and only the transmitted ray $E_{g1}$ is significant. For an incident ray 2A entering window 1, there are three returned rays, $E_t$, $E_{g1}$, and $E_{g2}$, as shown in FIG. 2. Because of the non-zero incident angle, the returned rays $E_{g1}$ and $E_{g2}$ are laterally displaced from the original incident location by approximately $d\theta(1-1/n)$, and go through different regions $x_1$ and $x_2$, respectively, of the window. If the thicknesses of the two regions are $d(x_1,y)$ and $d(x_2,y)$, respectively, the complex amplitudes of the three returned rays are $$E_t = s\exp i[2\phi_w(x,y) + \phi_r(x,y)], \qquad (1.1)$$

$$E_{g1} = r^2s \exp i[\phi_w(x,y) + \phi_w(x_1,y) + \phi_r(x,y) + 2d(x_1,y)n\cos(\theta')k], \qquad (1.2)$$

$$E_{g2} = r^2s \exp i[\phi_w(x,y) + \phi_w(x_2,y) + \phi_r(w,y) + 2d(x_2,y)n\cos(\theta')k], \qquad (1.3)$$

where $k = 2\pi/\lambda$, and $\theta'$ is the refracted angle inside the window. $\phi_w(x,y)$ and $\phi_r(x,y)$ are the contributions of window 1 and return flat 9, respectively, to the complex amplitudes of the returned rays.

For a thin window or small incident angle, the displacement is negligible, i.e., $x_1 \approx x_2$.

In FIG. 2, return flat 9 is not tilted (i.e., is perpendicular to the incident ray or optical axis of the interferometer), so $x_1 \approx x_2 \approx x$. The "wedge angle" is the angle between the opposed surfaces 1A and 1B of the window 1 in the x direction, i.e., the wedge direction. Because of the wedge angle, the optical thickness $d(x,y)n$ is not constant over the area of window 1. The phase of the vector sum of the phasors of the three returned rays $E_t$, $E_{g1}$, and $E_{g2}$ is a function of $d(x,y)n$, with a period of $\lambda$. Because the vector sum of the three phasors $E_t$, $E_{g1}$, and $E_{g2}$ varies with the optical thickness of window 1 along its wedge direction, i.e., the x direction, the resulting wavefront has ripples. An important example of the problems caused by such ripples is that they have prevented accurate measurement of windows used in large lasers, wherein windows with extremely flat, parallel surfaces are required.

There has long been an unmet need for a technique to eliminate inaccuracies caused by ghost fringes in the transmitted wavefronts of an optical window having a minute wedge angle. (One arc-second is one thirty-six hundredth of a degree.)

SUMMARY OF THE INVENTION

Accordingly, it is an object of the invention to provide a method for eliminating the effects of ripple associated with a wavefront transmitted by an optical window having a small wedge angle while this transmitted wavefront is reflected by a return surface back to the detector of the interferometer.

It is another object of the invention to provide an apparatus and method for eliminating "ripple" of the $E_t$, $E_g$, and $E_{g2}$ wavefronts transmitted by an optical window, which can be planar or dome-shaped, and returned back through the optical window to produce the $E_t$, $E_g$, and $E_{g2}$ wavefronts.

Briefly described, and in accordance with one embodiment thereof, the invention provides a technique for eliminating "ripple" or ghost fringes from an interferogram of a wavefront transmitted by an optical window with a very small wedge angle. A collimated beam produced by the interferometer is transmitted through the optical window. The optical window is tilted so as to prevent direct reflections from both surfaces of the window from entering a detector of the interferometer. The beam transmitted through the window is reflected back through the window by a return surface (which can be a flat or spherical surface) and transmitted to the detector. The return surface is tilted slightly in the direction of or opposite to the direction of tilt of the window, causing the re-incident angle of the returned ray to be different from the original incident angle. This causes the multiple reflections within the window to be different and out of phase, allowing the ghost fringes to cancel by appropriately tilting the return surface.

DETAILED DESCRIPTION OF THE PREFERRED EMBODIMENTS

FIG. 1 shows the basic structure of a laser phase shifting interferometer 33, including a laser light source 20 which produces a beam that is collimated by a collimator lens 28. The collimated beam is transmitted through a beam splitter 17, through a transmission flat 12 moveable/tiltable by a piezoelectric transducer (PZT) 14. The collimated beam is transmitted through an optical window 1 having a small wedge angle to a return flat 9. Optical window 1 is tilted to produce an angle of incidence $\theta$ with respect to ray 2A to prevent rays of direct reflections by both surfaces of the window from passing back into interferometer 33 and then being reflected by beam splitter 17 into detector 30. For the rays reflected by the return flat, they are transmitted through the window and passed back into the interferometer. Rays reflected from beam splitter 17 into imaging lens 29 are focused to image the window onto a suitable detector 30, such as a CCD detector array. CCD detector array 30 is scanned by suitable electronics, and the resulting intensity data for each pixel is supplied to computer 32. Computer 32 operates well known phase shifting software programs to compute the OPD (optical path difference) between the wavefront reflected by flat surface 12A of transmission flat 12 and the wavefront transmitted through optical window 1 and reflected by return flat 9.

In accordance with the present invention, the tilt of return flat 9 can alter the effect of the multiple reflections on the phase measurement so as to eliminate the above described ghost fringes.

Figures 3, 4:
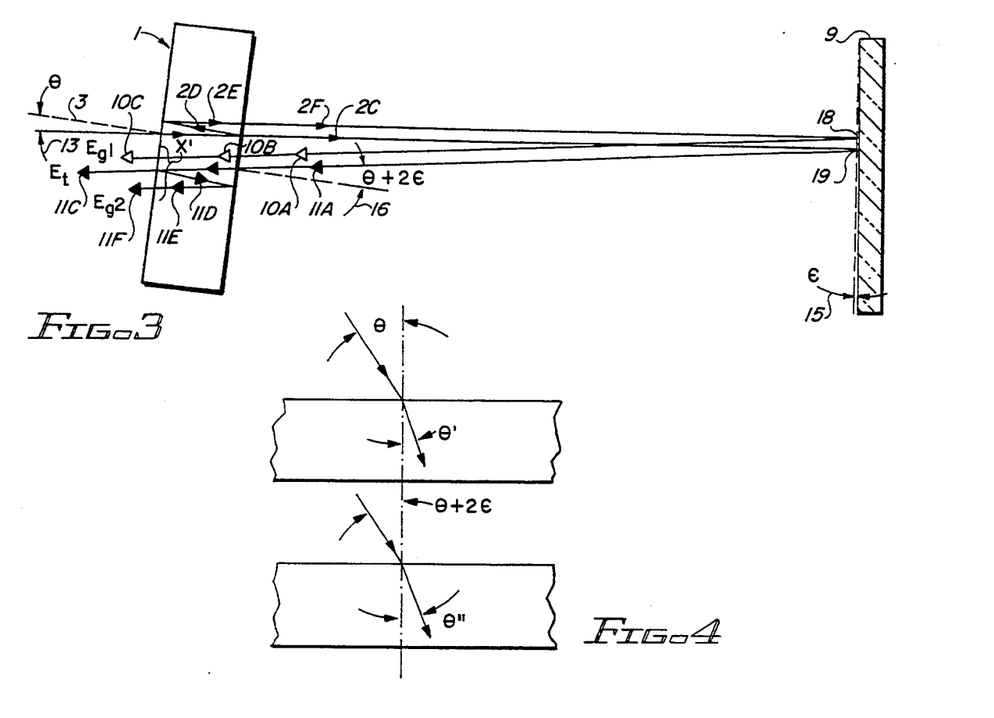
FIG. 3 is a diagram useful in explaining the technique and apparatus of the present invention.
FIG. 4 is a diagram useful in explaining the angles $\theta'$ and $\theta''$.

Referring to FIG. 3, if return flat 9 is tilted at an angle $\epsilon$ indicated by arrows 15, the returned ray $E_t$ designated by numeral 11C deviates from the original location x to x' on the window. When both window 1 and return flat 9 are tilted in the same direction, the incident angle of returned ray 11A is $\theta - 2\epsilon$. If window 1 and return flat 9 are tilted in the opposite direction, then the incident angle of returned ray 11A is $\theta+2\epsilon$, as shown by arrows 16 in FIG. 3. Since the three returned rays $E_t$, $E_g$, and $E_{g2}$ are close to each other, $x'$ is used to indicate their locations on window 1. The distance of $x'$-$x$ is defined as the "walk-off" distance. It is desirable that the walk-off distance be minimized. Otherwise, the measured wavefront is determined by the sum of two optical paths within the window. For simplicity, it is assumed that the lateral displacement $d\theta(1-1/n)$ due to refraction is smaller than the walk-off distance $x'$-$x$. Therefore, the OPD (optical path difference) between $E_t$ and $E_{g2}$ is equal to $2d(x',y)n \cos(\theta'')$, where $\theta''$ is the corresponding refracted angle for the incident angle of either $\theta-2\epsilon$ or $\theta+2\epsilon$ (depending on the tilt directions). $\theta'$ and $\theta''$ are illustrated in FIG. 4.

The complex amplitudes of the three returned rays are given by the equations $$E_t = s\ \exp i[\phi_w(x,y) + \phi_w(x',y) + \phi_f(x,y)], \quad (2.1)$$

$$E_{g1} = r^2 s\ \exp i[\phi_w(x,y) + \phi_w(x',y) + \phi_f(x,y) + 2d(x,y)n \cos(\theta')k], \quad (2.2)$$

$$E_{g2} = r^2 s\ \exp i[\phi_w(x,y) + \phi_w(x',y) + \phi_f(x,y) + 2d(x',y)n \cos(\theta'')k], \quad (2.3)$$

It should be noted that for $E_{g1}$ the multiple reflections occur at $x$, not $x'$, so the OPD between $E_t$ and $E_{g1}$ is equal to $2d(x,y)n \cos(\theta')$, not $2d(x',y)n \cos(\theta'')$. Because the refractive angle $\theta''$ of returned ray is not equal to $\theta'$, the value of $2d(x',y)n \cos(\theta'')$ is different from that of $2d(x,y)n \cos(\theta')$. This makes it possible to cancel ghost fringes corresponding to $E_{g1}$ by destructive interference with ghost fringes corresponding to $E_{g2}$ and thereby eliminate the ghost fringes caused by multiple reflections in window 1.

Figure 5:
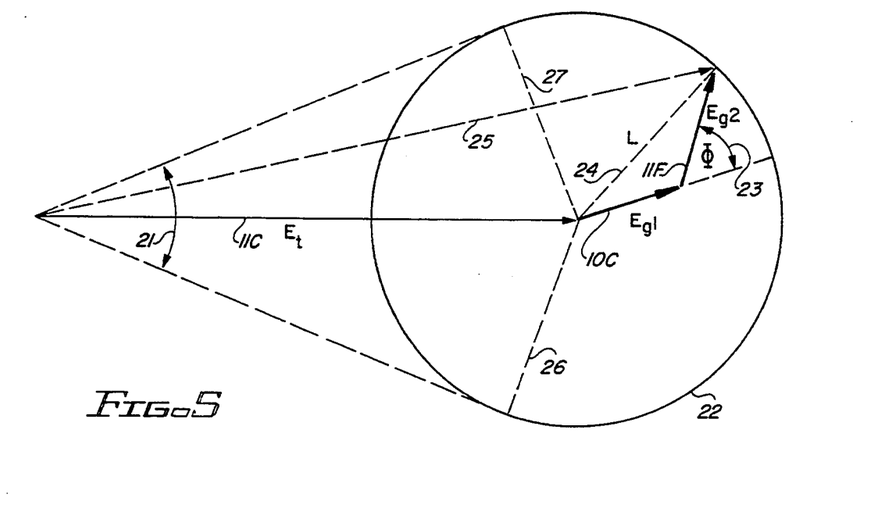
FIG. 5 is a diagram illustrating vector addition of the transmitted ray phasor and the first and second ghost ray phasors and how ghost fringes are produced in the interferogram of an optical window.

Referring to FIG. 5, $\Phi$ is the angle between $E_{g1}$ and $E_{g2}$, and L is the magnitude of the sum phasor $E_{g1}+E_{g2}$. This diagram indicates how ghost ray phasors $E_{g1}$ and $E_{g2}$ can cancel if $\Phi$ is 180°, since they are of equal magnitude. Because $E_{g1}$ and $E_{g2}$ have the same magnitude, $\Phi$ and L can be expressed as $$\Phi = 2d(x,y)n \cos(\theta')k - 2d(x',y)n \cos(\theta'')k, \quad (3.1)$$

$$L = 2r^2 s |\cos(\Phi/2)|. \quad (3.2)$$

For a given L, the two extremes of the errors are $\pm \sin^{-1}$ $$\left(\frac{L}{|E_t|}\right)$$

in radians. Therefore $$\text{Phase error} = 2|\sin^{-1}[2r^2\cos(\Phi/2)]| \quad \text{(in radians)} \quad (4.1)$$
$$= |\sin^{-1}[2r^2\cos(\Phi/2)]|/\pi \quad \text{(in fringes)}$$

From Equations (3) and (4), when $\Phi$ is equal to an odd multiple of $\pi$, both L and the error are zero. When $\Phi$ is an even multiple of $\pi$, both L and the error are maximum. If the coefficient of the reflection is approximately 20% (i.e., $r^2=4\%$) then the phase error can be expressed as 0.0254 fringes. For simplicity, it is assumed that the walk-off $x'$-$x$ is negligible or the window has an equal thickness in the direction of the walk-off, e.g., the x direction. Hence $d(x,y)=d$, and $$\Phi = 2dnk\{[1 - \sin^2(\theta)/n^2]^{\frac{1}{2}} - [1 - \sin^2(\theta - 2\epsilon)/n^2]^{\frac{1}{2}}\}, \quad (5)$$

$$\Phi \approx 4dk\theta\epsilon/n, \text{ if } \epsilon << \theta << 1, \quad (6)$$

$$\Phi \approx 2dk(2\theta - 2\epsilon)\epsilon/n, \text{ if } \epsilon \approx \theta << 1. \quad (6.1)$$

It is important to note that because the term $[1-\sin^2(\theta)/n^2]^{\frac{1}{2}} - [1-\sin^2(\theta-2\epsilon)/n^2]^{\frac{1}{2}}$ is a very small number, the angle $\Phi$ is not sensitive to d, but is very sensitive to $\epsilon$ and $\theta$. From Equation (5), the values of $\Phi$, L, and phase error (in fringes) are listed in Table 1 below for different tilt angles $\theta$ and $\epsilon$, where $n=1.5$, $\lambda=633$ nm, and $d=10$ or 20 mm.

TABLE 1

| $\theta$ | $\epsilon$ (d = 10 mm) | $\epsilon$ (d = 20 mm) | $\Phi$ | L | Phase error (pv) |
|---|---|---|---|---|---|
| X | 0° | 0° | 0 | $2r^2s$ | 0.0254 |
| 0.5° | 0.06853° | 0.03633° | $\pi$ | 0 | 0 |
| 0.5° | 0.12474° | 0.06853° | $2\pi$ | $2r^2s$ | 0.0254 |
| 1° | 0.03756° | 0.01912° | $\pi$ | 0 | 0 |
| 1° | 0.07266° | 0.03756° | $2\pi$ | $2r^2s$ | 0.0254 |
| 2° | 0.01930° | 0.00970° | $\pi$ | 0 | 0 |
| 2° | 0.03825° | 0.01931° | $2\pi$ | $2r^2s$ | 0.0254 |

The condition $\Phi=m\pi$ is important for minimizing (m=odd) or maximizing (m=even) the effect of multiple reflections. Because $\epsilon << \theta << 1$ in most cases, from Equation (6) and the condition of $\Phi=m\pi$, the expression $4dk\theta\epsilon/n=m\pi$ is obtained, where $\theta$ and e are in radians. Therefore, the phase error is either minimum ($\approx 0$) or maximum (phase error $\approx 2r^2/\pi$, in fringes) when one of the following conditions is satisfied.

(7) Phase error is minimum, if $d\theta°\epsilon°/\lambda n \approx m \times 0.000406$ and m=odd, (8) Phase error is maximum, if $d\theta°\epsilon°/\lambda n \approx m \times 0.000406$ and m=even, where $\theta°$ and $\epsilon°$ are equivalent to $\theta$ and e in degrees, d is in mm (millimeters), $\lambda$ is in nm (nanometers), and r is the coefficient of reflection of window 1. From Equations. (7) and (8), if n=1.5 and $\lambda=633$ nm, then $$d\theta°\epsilon° \approx 0.386 \text{ m} \quad (9)$$

where m is a natural number. The results of this equation for m=1 and m=2 correspond to those in Table 1 for $\Phi=\lambda$ and $2\lambda$, respectively. This equation is very useful for estimating the proper tilt angles for window 1 and return flat 9.

Figure 6A:
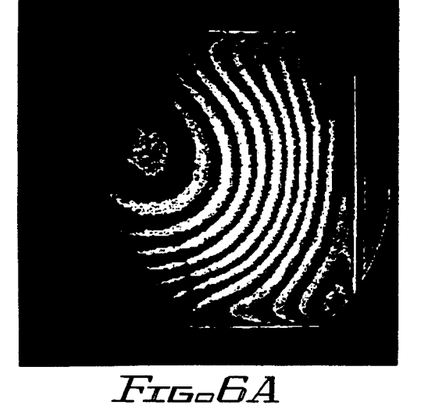
FIG. 6A is an image of a measured intensity distribution of a wavefront transmitted by an optical window with a small wedge angle, showing a ghost fringe pattern.
Figure 6B:
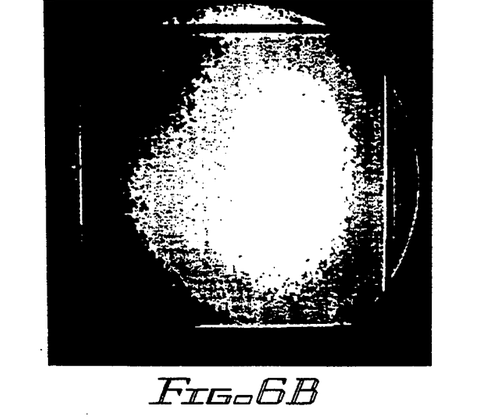
FIG. 6B is an image of a measured intensity distribution of the optical window of FIG. 6A with the ghost fringe pattern eliminated in accordance with the present invention.

FIG. 6A shows the intensity distribution of a 120×120×3 mm thin fused silica plate 1 used as window 1. The intensity distribution is obtained using interferometer 33 without transmission flat 12, when return flat 9 is not tilted. The intensity distribution includes several very curved ghost fringes in a fixed pattern caused by the above described multiple reflections in silica plate 1. It should be noted that these curved ghost fringes have a sharp bending around the boundary of the plate due to a rapid thickness variation at the edges of silica plate 1. The ghost fringes disappear when return flat 9 is tilted properly, as shown in the resulting distribution of FIG. 6B.

In an experiment using a laser phase-shifting Fizeau interferometer, a window 1 of a BK7 plate (20 mm thick and 150 mm in diameter, with a wedge angle of 1.725 arc-seconds) is placed between the return flat 9 and transmission flat 12 (FIG. 1). If the wedge angle of window 1 is oriented in the vertical direction, it can be shown that window 1 introduces six horizontal fringes in the transmitted wavefront.

The intensity pattern of the sum of the three returned rays $E_t + E_{g1} + E_{g2}$ is observed by removing transmission flat 12 from the interferometer or by beveling it to a large angle. Window 1 is tilted so that no direct reflections from the front surface 1A and the rear surface 1B of window 1 enter detector 30. The tilt direction of window 1 can be categorized into two cases: (1) the window tilt direction is perpendicular to the window wedge direction, and (2) the window tilt direction is parallel to the window wedge direction. For convenience, window 1 is oriented so that the wedge angle of window 1 is in the y-direction, and window 1 is either tilted in the x-direction or in the y-direction. For the first case, window 1 is tilted so that $\theta = 0.5°$ in the x-direction. When return flat 9 is not tilted, i.e., when $\epsilon = 0°$, faint but obvious horizontal interference (ghost) fringes can be observed in the intensity pattern. When return flat 9 is tilted in the x-direction, $\epsilon = 0.03633°$. From Table 1, $\Phi = \pi$, so the ghost fringes disappear. Increasing the tilt of return flat 9 to $0.06853°$ causes the fringes to reappear. In the second case, window 1 is tilted in the y-direction ($\theta = 0.5°$), i.e., the window tilt direction is parallel to the window wedge direction. When return flat 9 is tilted in the y-direction, $\epsilon = 0.03633°$, and the ghost fringes disappear. Therefore, as long as return flat 9 is tilted in the same plane as the tilt of window 1, the interference ghost fringes can easily be made to disappear, regardless of the window wedge direction. On the other hand, whenever $\epsilon = 0°$, the interference ghost fringes cannot be eliminated.

Figure 7A:
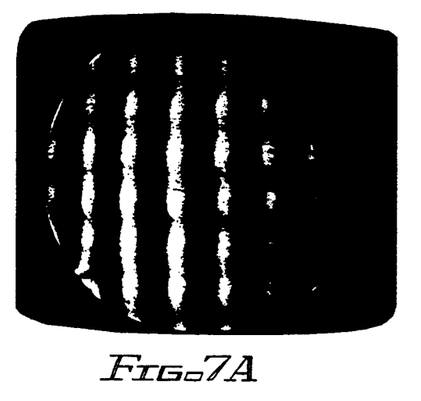
FIG. 7A is an image of a measured intensity distribution for an optical window showing a "ripple" superimposed on vertical fringes of an interferogram formed by a wavefront transmitted by the optical window and a reference wavefront.
Figure 7B:
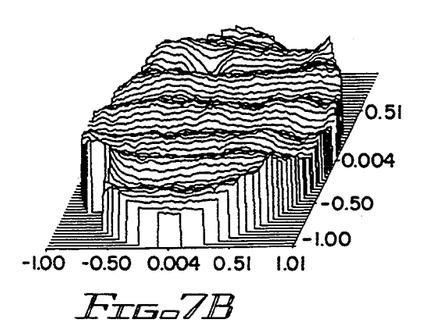
FIG. 7B is a perspective view of an OPD profile representing distortions in a wavefront transmitted by the optical window of FIG. 7A, computed from the intensity pattern shown in FIG. 7A by a phase-shifting interferometer.
Figure 8A:
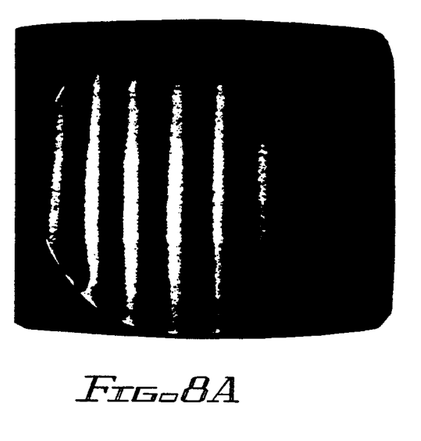
FIG. 8A is an image of the intensity distribution for the optical window of FIG. 7A, with the ghost fringe pattern eliminated in accordance with the present invention.
Figure 8B:
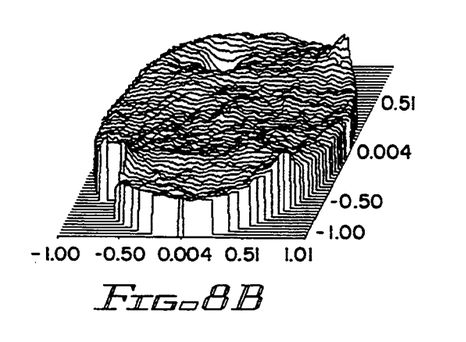
FIG. 8B is a perspective view of an OPD profile representing distortions in a wavefront transmitted by the optical window of FIG. 7A, computed from the intensity pattern of FIG. 8A.

To measure the phase of the wavefront resulting from the three returned rays $E_t + E_{g1} + E_{g2}$, transmission flat 12 is inserted back into interferometer 33 (if it was removed) and tilted to produce several vertical fringes in the interferogram. FIG. 7A shows the intensity pattern for window 1 as described in the foregoing example when return flat 9 is not tilted FIG. 7B shows the corresponding measured transmitted wavefront. FIG. 8A shows the intensity pattern for window 1 when return flat 9 is tilted in the x-direction by an amount $\epsilon = 0.03633°$. The window is tilted $0.5°$ in the x-direction. FIG. 8B shows the corresponding measured wavefront.

When return flat 9 is not tilted, there are several vertical main fringes and six horizontal ghost fringes as shown in FIG. 7A. The ripples have a phase error of approximately $0.025\lambda$. When return flat 9 is tilted at $\epsilon = 0.03633°$ in the x-direction, the ghost fringes disappear, as is apparent from FIG. 8A.

Figure 9:
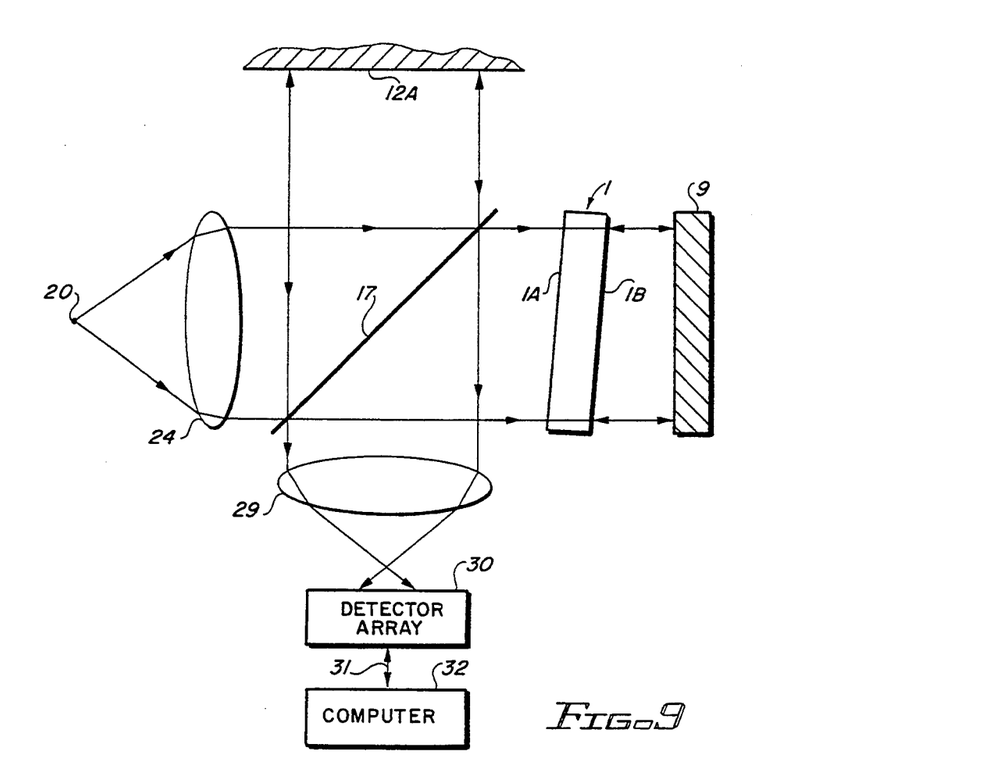
FIG. 9 is a diagram of a Twyman-Green interferometer which can be used in the practice of the present invention.

The following procedure for a Fizeau interferometer (as shown in FIG. 1) is proposed to effectively remove the ghost fringes. This procedure can also be applied to a Twyman-Green interferometer (as shown in FIG. 9), where the reference mirror is equivalent to surface 12A of the transmission flat 12. The steps of the proposed procedure include:

(1) Tilt transmission flat 12 by a large angle to avoid the main interference fringes. Adjust return flat 9 so that it is perpendicular to the collimated laser beam.

(2) Insert window 1 into the cavity bounded by transmission flat 12 and return flat 9 and orient window 1 so that its wedge angle is in a particular direction.

Choose a proper tilt angle $\theta$ for the window. Tilt window 1 at this angle in any direction. A faint interference pattern detected by detector 30 can be observed.

(3) Tilt return flat 9 in the same or opposite direction as the direction in which window 1 is tilted in step (2). The faint interference pattern in step 2 disappears, and then appears repeatedly as the tilt angle of return flat 9 increases. The return flat tilt angle corresponding to the first disappearance of the ripple interference pattern should be chosen because it introduces the smallest walk-off. (This is desirable because walk-off causes the wavefront measured to be determined by contributions of two different optical paths through window 1. Accordingly, it is desirable to have the two optical paths as close together as possible.) This tilt angle corresponds to $\epsilon°$ in Equation (9) for $m = 1$.

(4) Adjust transmission flat 12 to form the main interference fringes.

When the fixed ghost fringe includes several fringes, the disappearance of such fringes in step (3) is very obvious, and the foregoing procedure is easy to follow. However, if the wedge angle of window 1 is so small and the surfaces are so flat that the ghost interference pattern which appears in step (2) is only approximately one fringe or less, then it might be difficult to observe the disappearance of that fringe in step (3).

In summary, when testing an optical window, a collimated beam is transmitted through window 1 and then is reflected back by return flat 9. Window 1 is always tilted, so the incident angle to the window is non-zero. If return flat 9 is tilted slightly, the re-incident angle of the ray reflected by return flat 9 is different from the original incident angle of collimated beam. Therefore, the multiple reflections within window 1 related to these two incident angles are different, and the ghost fringes can be cancelled for certain return flat tilt angles. To remove ghost fringes, there must be a component of the return flat rotation $\theta(t)$ that is about an axis parallel to the rotational axis of the optical window. To effectively remove the ghost fringes, return flat 9 should be tilted in the same plane as for the tilt of the window, regardless of the window wedge direction. In other words, the return flat 9 should be tilted (rotated) about an axis that is parallel to the tilt axis of window 1. The described method allows measurement of the wavefront transmitted by a window with a small wedge angle of as little as several arc-seconds without using anti-reflective coatings on both surfaces.

As explained above, the measurement of a precision optical window requires an accuracy of the transmitted wavefront to within 0.1 fringes or less. The 0.025 ghost fringe error caused by the above described multiple reflections can significantly effect (approximately 25 percent error) the accuracy of the transmitted wavefront measurement. The above described invention completely avoids this source of error in the measurement of windows with small wedge angles.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, a computer could be operated to automatically tilt the return flat through the desired angle ε. The interferometer need not be a Fizeau type as shown in FIG. 1, but can be a Twyman-Green interferometer as shown in FIG. 9, wherein the transmission flat 12 of FIG. 1 is omitted, and a reference surface 12A in a separate reference arm is used instead. The window 1 need not be planar, but can be dome-shaped as shown in FIG. 10, with non-zero "wedge angles".

Figure 10:
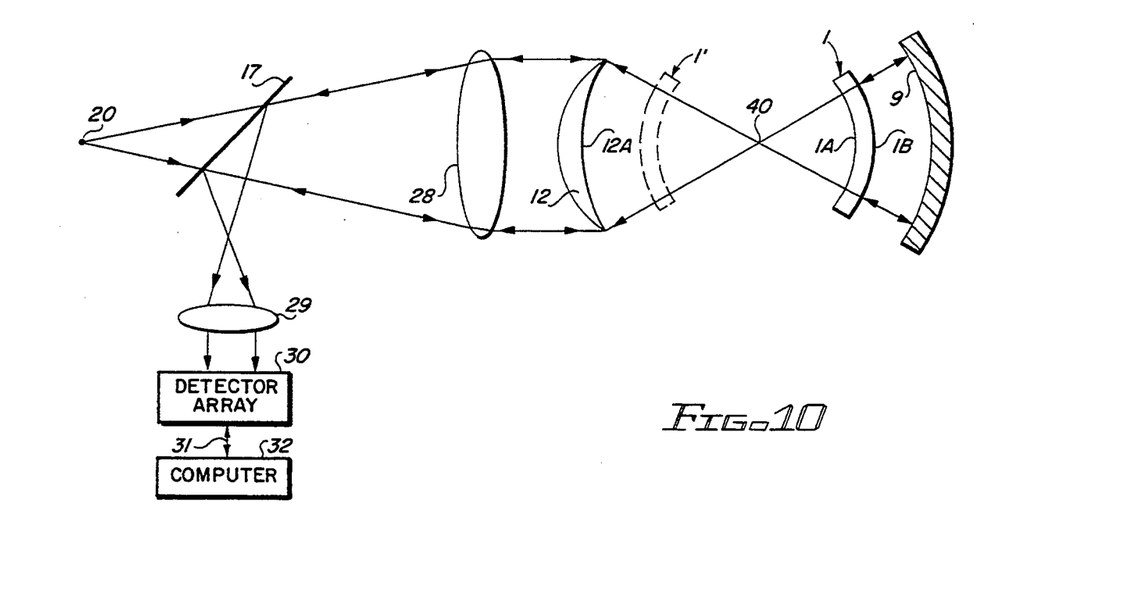
FIG. 10 is a diagram similar to FIG. 1, for a dome-shaped window with a non-zero "wedge angle".

In FIG. 10, the same numerals have been used as in FIGS. 1 and 9 to designate corresponding elements. (Note that in any of those figures beamsplitter 17 can be placed ahead of or after collimating lens 28.) An experiment was performed to determine if the arrangements of FIGS. 1 and 9 would be effective for a non-planar window 1 with "parallel" surfaces 1A and 1B having a small "wedge angle" between them. Portions of spheric surfaces 1A and 1B are "non-parallel" in the sense that they have slightly different centers of curvature, and are said to have a "wedge angle" between them.

The experiments were performed using the set-up shown in FIG. 10, with window 1 being 3 inches in diameter and having nearly spheric surfaces 1A and 1B with radii of curvatures of 97.5 millimeters and 103.4 millimeters, respectively. Transmission sphere 12 had a diameter of 6 inches and an f-number 1.1, and reference surface 12A had a radius of curvature of 130 millimeters. The "wedge angle" of window 1 was large enough to produce approximately 4 ghost fringes in the image of the interferogram. Return surface 9 had a center of curvature located at the focal point 40 of transmission sphere 12, coincident with the radii of curvature of window 1. (Note that dotted line 1' in FIG. 10 indicates an alternate placement of window 1 that allows use of a small return surface 9.) It was found that slight tilting of return surface 9 caused the 4 ghost fringes to disappear, leaving only the main interference fringes.

Some difficulty was experienced in tilting transmission sphere 12 enough to completely remove the main fringes from the image detected by detector array 30 because the focal point 40 would move excessively. Therefore, only a small amount of tilting of transmission sphere 12 was performed to eliminate some of the main fringes from the interferogram imaged detected by detector 30. Return surface 9 was tilted slightly to eliminate the 4 ghost fringes, with some of the main fringes still present.

It should be noted that the program executed by computer 32 could be adapted to automatically tilt return flat (or return sphere) 9 through the angle e necessary to eliminate the ghost fringes by applying a suitable control signal 37 to a PZT or the like supporting return flat 9 by means of mechanical connection 38.

What is claimed is:

1. A method for avoiding distortion in a wavefront transmitted through an optical window having a very small wedge angle during measurement of the wavefront by an interferometer including optics producing a collimated beam, a return flat in the path of the collimated beam, and a detector producing signals representing an image of an interferogram produced by interference between a reference wavefront reflected from a reference surface and a reflection of a transmitted wavefront by the return flat, the interferogram including main interference fringes representing distortion caused in the transmitted wavefront by the optical window and one or more ghost fringes caused by multiple reflections within the optical window, the method comprising the steps of:
   (a) positioning the optical window in the path of the collimated beam so the optical window is tilted in a first direction to cause the collimated beam to have a particular incident angle with respect to the optical window;
   (b) transmitting the collimated beam through the optical window to produce the transmitted wavefront and causing it to propagate to the return flat, the return flat being perpendicular to the collimated beam, the transmitted wavefront experiencing multiple reflections in the window;
   (c) reflecting the transmitted wavefront from the return flat back through the optical window, the reflected wavefront experiencing multiple reflections in the window, a faint ghost fringe interference pattern including one or more of the ghost fringes appearing in the interferogram being resolved by the detector; and
   (d) tilting the return flat in a particular direction until the ghost fringe interference pattern in the image produced by the detector disappears.

2. The method of claim 1 wherein the tilting of step (d) is in the first direction or a direction opposite to the first direction.

3. The method of claim 2 including tilting a reference surface to cause the main interference fringes to appear in the image produced by the detector.

4. The method of claim 1 wherein the wedge angle is small enough to result in at least one ghost fringe in an image of the distortions produced by the optical window in the transmitted wavefront produced by the interferometer.

5. The method of claim 1 including positioning a transmission flat in the interferometer in the path of the collimated beam ahead of the optical window and tilting the transmission flat to prevent the main interference fringes from being included in the image produced by the detector.

6. The method of claim 1 wherein the optical window includes opposed generally flat surfaces having nearly infinite radii of curvature.

7. The method of claim 1 including positioning a reference flat in a path of a portion of the collimated beam reflected by a beamsplitter between the optical window and the optics producing the collimated beam and tilting the reference flat to prevent the main interference fringes from being included in the image produced by the detector.

8. The method of claim 1 wherein step (d) includes measuring the signals produced by the detector to determine when the ghost fringes disappear and automatically tilting the return flat to cause the ghost fringes to disappear.

9. A method for avoiding distortion in a wavefront transmitted through an optical window having a very small wedge angle during measurement of the wavefront by an interferometer including optics producing a collimated beam, a return surface, and a detector producing signals representing an image of an interferogram produced by interference between a reference wavefront reflected from a reference surface and a reflection of a transmitted wavefront by the return surface, the interferogram including main interference fringes representing distortion caused in the transmitted wavefront by the optical window and one or more ghost fringes caused by multiple reflections within the optical window, the method comprising the steps of:

(a) positioning a transmission sphere in the path of the collimated beam;

(b) positioning the optical window in a path of a beam focused by the transmission sphere so the optical window is tilted in a first direction to cause a direction of propagation of the beam focused by the transmission sphere to have a particular incident angle with respect to the optical window;

(c) transmitting the beam focused by the transmission sphere through the optical window to produce the transmitted wavefront and causing it to propagate to the return surface, the return surface being perpendicular to rays of the transmitted wavefront, the transmitted wavefront experiencing multiple reflections in the window;

(d) reflecting the transmitted wavefront from the return surface back through the optical window, the reflected wavefront experiencing multiple reflections in the window, a faint ghost fringe interference pattern including one or more of the ghost fringes appearing in the interferogram being resolved by the detector; and (e) tilting the return flat in a particular direction until the ghost fringe interference pattern in the image produced by the detector disappears.

10. The method of claim 9 wherein the optical window includes opposed major surfaces having finite radii of curvature.

* * * * *